Feb. 3, 1948.  L. W. DOWNEY  2,435,343
POWER SHUT-OFF AND SIGNALLING APPARATUS
Filed May 18, 1944  3 Sheets-Sheet 1
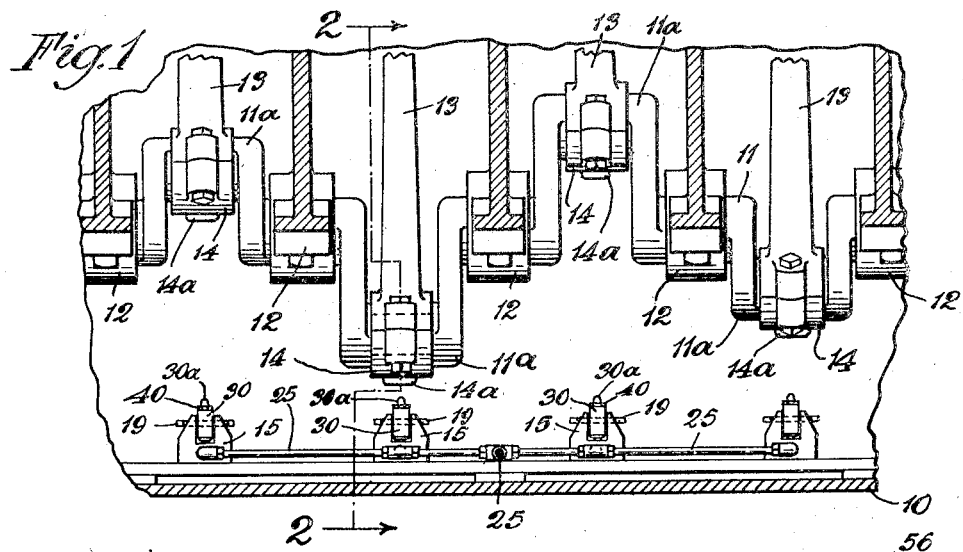
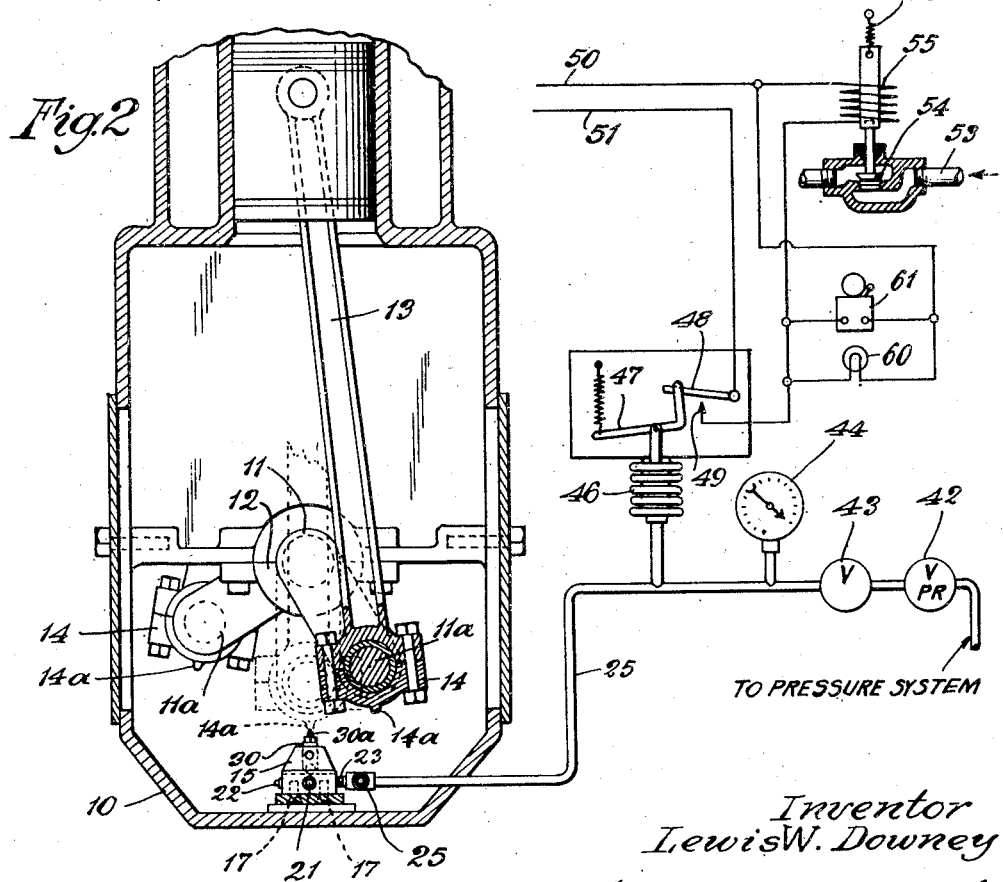
Inventor
Lewis W. Downey
by Sheridan, Davis and Cargill
Attorneys

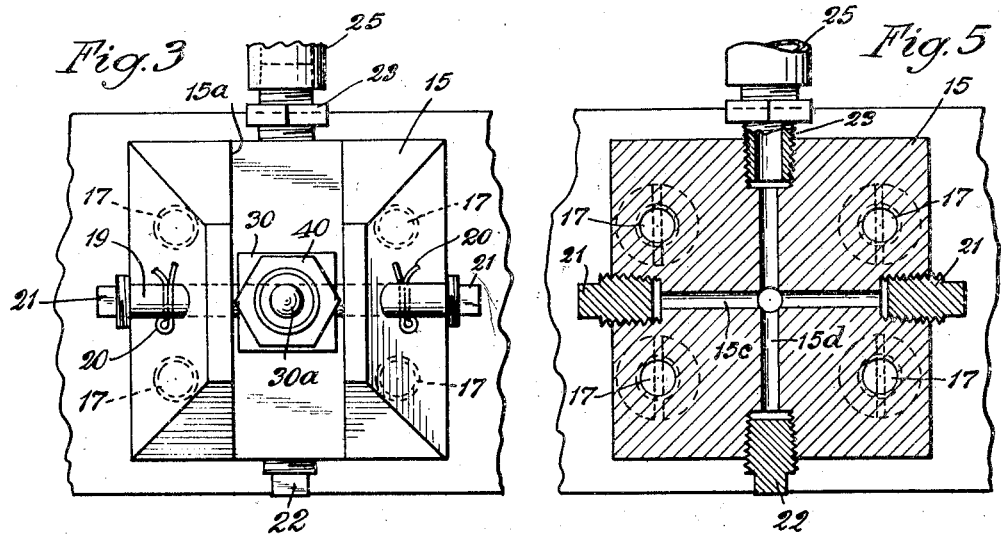
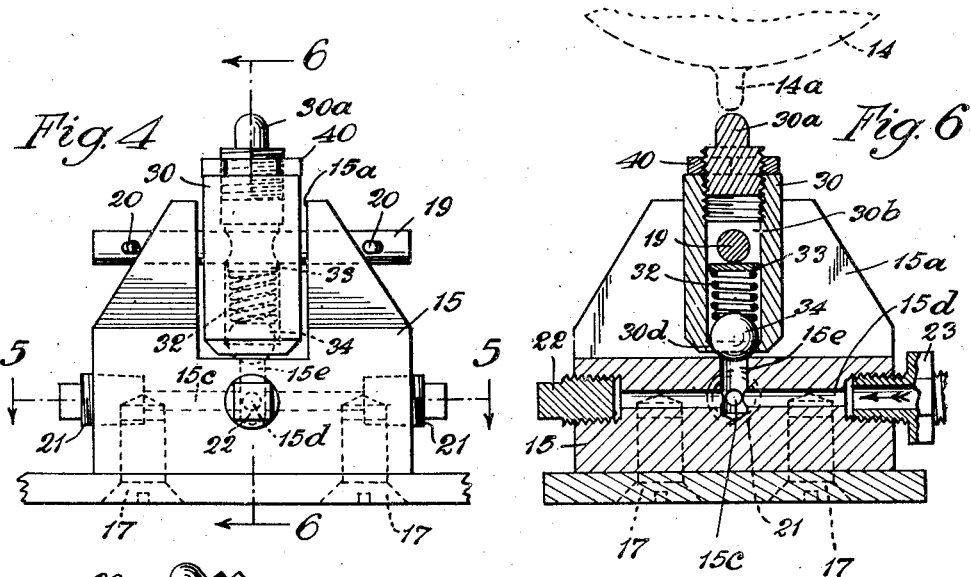
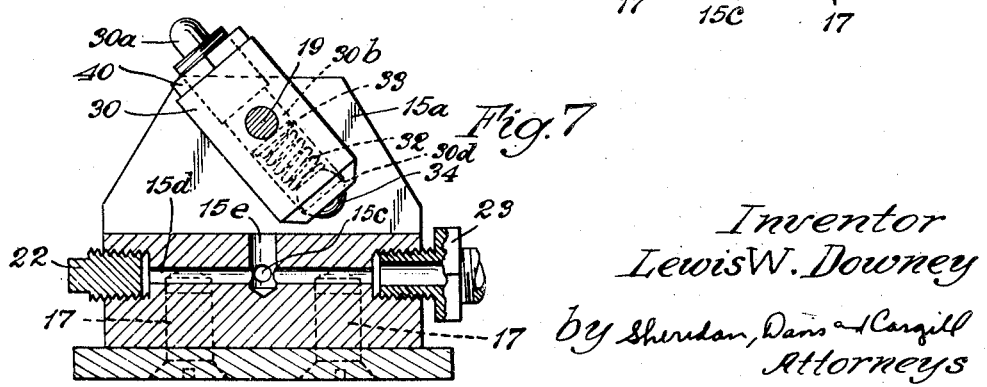

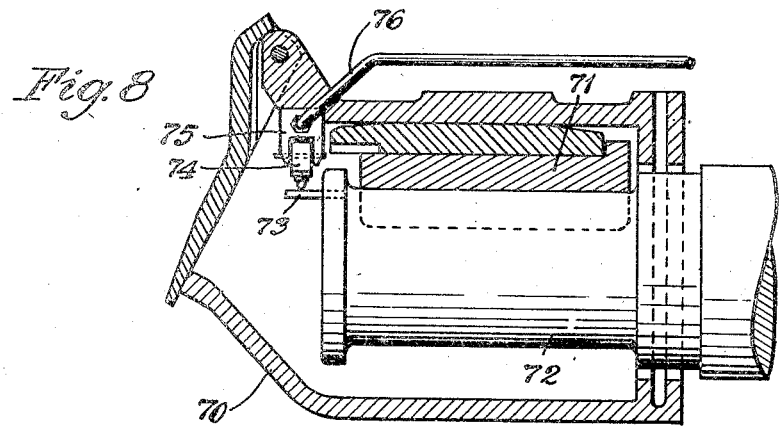
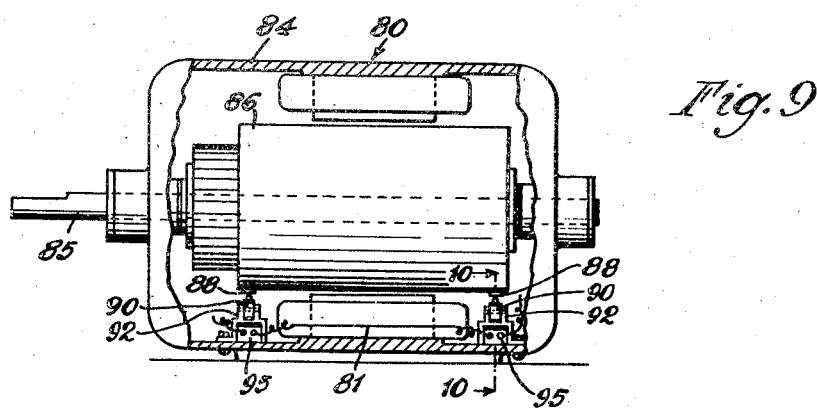
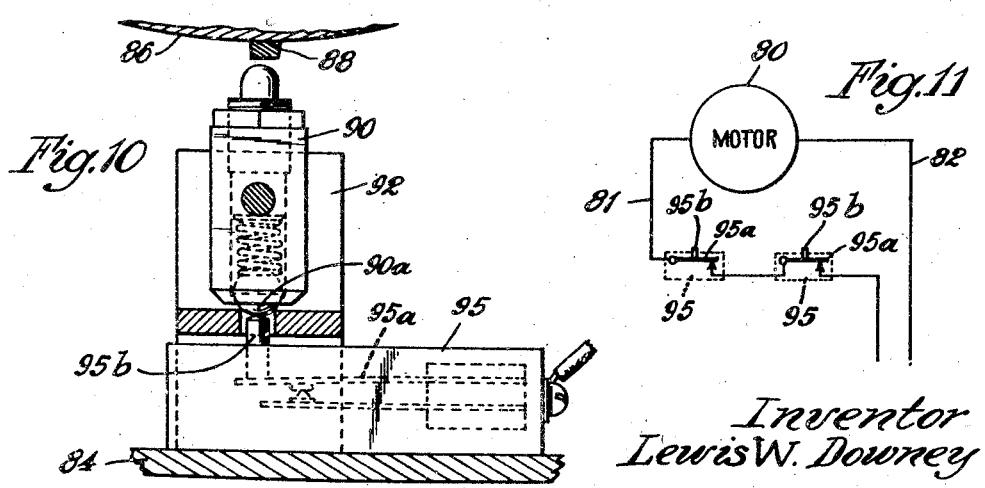

Patented Feb. 3, 1948

2,435,343

UNITED STATES PATENT OFFICE 2,435,343

POWER SHUTOFF AND SIGNALLING APPARATUS

Lewis W. Downey, Oak Park, Ill.

Application May 18, 1944, Serial No. 536,216

4 Claims. (Cl. 123—198)

This invention relates to improvements in power shut-off and signal apparatus and has for an objective to provide means including a member or element lying adjacent the orbit of a rotating power or power-driven element constructed and arranged to be actuated by said element in the event of its departure from its normal orbit, as, for example, because of bearing failure. When so actuated, a controlling circuit and power shut-off means will be actuated to terminate the application of power to the rotating element. It is also contemplated that signal means may be included in the apparatus to indicate visibly and/or audibly such bearing failure and termination of power effort.

Another object is to provide as an element of such apparatus a trigger member and mounting adapted for quick and easy installation and for control of an airline and/or an associated electric circuit or for direct control of an electric circuit.

Other objects will be apparent from a reading of the following specification and an examination of the accompanying drawings.

In the drawings:

Figure 1 is a side view, partially in section, of a crank shaft of a gas engine such as a Diesel locomotive motor showing my apparatus in part as applied thereto;

Fig. 2 is a vertical section along the line 2—2 of Fig. 1 with the addition of a control circuit;

Fig. 3 is a plan view, drawn to an enlarged scale, of the trigger member and mounting;

Fig. 4 is a side elevation of the same;

Fig. 5 is a horizontal section along the line 5—5 of Fig. 4;

Fig. 6 is a vertical section along the line 6—6 of Fig. 4;

Fig. 7 is a partial vertical section, corresponding to Fig. 6 but showing the trigger member tripped to open the pressure airline;

Fig. 8 is a vertical section through a railway car journal-box, showing the axle in elevation, and my apparatus applied thereto;

Fig. 9 is a vertical section through the casing of an electric motor showing the armature and shaft in elevation and showing my invention applied thereto;

Fig. 10 is a vertical section along the line 10—10 of Fig. 9 and drawn to an enlarged scale; and Fig. 11 is a diagrammatic view of a circuit for the electric motor of Fig. 9.

Like elements refer to like elements throughout the drawings in which 10 indicates generally a portion of the crank case of a gas engine, and more particularly a Diesel locomotive engine having a crank shaft 11, journalled in main bearings 12. Numerals 13, 13 illustrate portions of the conventional piston rods which are provided with cap bearing members 14 embracing the crank pins 11—a of the crank shaft. Mounted directly beneath each of the crank portions of the crank shaft 11, is an emergency control member comprising a block 15 secured, in the form shown in Figs. 1 to 7, to the bottom of the crank case, as by machine screws 17.

The block 15 is transversely slotted at 15a at the top thereof and is provided with a pin 19 extending transversely through the slot 15a, being secured against displacement by cotter-pins 20, for example. Ducts 15c, 15d extend transversely through the body of the block, the ends of the duct 15c being illustrated as sealed or closed by plugs 21. A similar plug 22 closes one end of the duct 15d, a nipple 23 being fitted in the other end of said duct and forming one terminus for a pressure airline 25. A vertical passage or duct portion 15e extends upwardly from the juncture of the ducts 15c and 15d to the slot 15a. A displaceable trigger member 30 is pivotally mounted in the slot 15a upon the pin 19 and is provided with a replaceable tip 30a normally projecting above the block 15, as illustrated in Fig. 4, for example. A socket 30b is provided in the trigger member 30 and houses a compression spring 32 confined at one end by washer 33 resting against the pin 19 and at the other end by bearing-ball 34 which protrudes from the socket 30b slightly below the end of the trigger member 30, being held in such socket by the inturned lip 30d of such trigger member. The arrangement is such that, when the trigger member is in the position illustrated in Fig. 6, the ball 34 will function as a valve to close the open end of the duct 15e and thereby the entire airline 25, the ball being yieldingly held in closing position, as will be apparent.

Incidentally, the spring pressure upon the ball 34 serves yieldingly to resist displacement or movement of the trigger member 30 from its normal position.

For convenience I have provided the bearing caps 14 each with a projecting lug 14a which normally rotates just out of contact with the tip portion 30a of the trigger member 30.

It will be apparent that should any of the piston rod bearings on the crank shaft become appreciably worn or should any of such bearings fail, the corresponding cap member will depart from its normal orbit, and if such wear or failure be in sufficient amount, the corresponding lug 14a will strike the tip 13a of the associated trigger member 30 and move it to the position illustrated in Fig. 7, opening the duct portion 15e and the airline 25. I have provided screw-threaded mountings for the tip members 30a which are secured in adjusted position relative to the lugs 14a by lock nuts 40 or the like. With this arrangement, I am able to locate the tips 30a as close to the normal orbits of the lugs 14a as may be desirable.

In the form of control means illustrated for effecting the interruption of power or flow of fuel to the engine, the airline 25, which forms part of the air pressure control circuit, leads to a source of air under pressure, as, for example, the pressure tank of a Diesel equipped locomotive. A reducing valve 42 is inserted in the line, which likewise includes a restricting or bleed valve 43 and a pressure gauge 44. During normal operation of the engine, pressure will build up in the line 25 to a point permitted by the reducing valve, and such pressure will be indicated by the gauge 44. Also included in this line is a Sylphon or expansible bellows member 46 which is normally maintained in distended condition by the air pressure in the line 25. Operatively attached to the bellows 46 is a switch arm 47 which in turn is connected to switch blade 48 normally out of contact with the switch point 49. Numerals 50—51 indicate main current leads, one of said leads being normally opened at switch point 49. I have illustrated a power shut-off device associated with the fuel line 53, in the form of a valve 54 which is included in the line. This valve is provided with a solenoid, generally indicated by 55 and normally is in open circuit with the leads 50—51. Valve 54 is normally held in open position by a spring 56 or the like, but upon closure of the circuit through the solenoid the valve will be promptly moved to position cutting off flow of fuel through the fuel line 53. I have also illustrated a signal light 60 and a signal bell 61 in the same electrical circuit which, as stated, is maintained open during normal operation of the engine. In the event of failure of one of the bearings or excessive wear thereof, the corresponding trigger member 30 will be tripped and the control valve or ball 34 will be moved from the normal position as described above. This results in the opening of the air pressure circuit, including the airline 25, and permits the air therein to exhaust through the duct portion 15e. The bleed valve 43 precludes admission of air to the line 25, in such circumstances, in sufficient amount to build up any appreciable pressure or loss of air, and the elimination of the pressure in the line results in the collapse of the bellows 46 and closure of the switch 48, 49, which in turn closes the electrical circuit to effect the actuation of the solenoid 55 and closure of the valve 54. At the same time the bell 61 will ring, and the light 60, located at any desired point for ready visibility by the operator, will also be lighted.

With cutting off of the fuel supply upon closure of the valve 54, operation of the engine will very shortly cease before damage can result to the crank shaft or possibly the other bearings, and it is a relatively simple matter to open the crank case, insert a new bearing member and reset the emergency shut-off device.

In Fig. 8 I have illustrated my invention as applied to a railroad car, the numeral 70 indicating a conventional form of journal box containing the bearing 71. The axle end 72 protrudes into the journal box and supports the bearing member 71 in well-known manner.

A pin or striker 73 projects from the axle end and adjacent the same is mounted a trigger member 74 which is out of the normal orbit of the pin 73. This trigger member and the block 75 which carries it are generally similar to the device illustrated in Figs. 4 and 6 for example, and normally close one end of an airline 76 which leads to the air tank or reservoir for the brake line. In the event of excessive wear or failure of the bearing 71, the trigger member 74 will be tripped by the pin 73, opening the airline 76 and permitting exhaust of the brake air, which, as is well known, will result in automatic application of the brakes and stoppage of the car or train before substantial damage can result.

In Figs. 9 to 11 I have illustrated my invention as applied to an electrical motor generally indicated by 80 and receiving current from the leads 81, 82.

The motor includes a housing 84, in which is journalled the shaft 85 of the armature 86. Projecting slightly from the armature are small lugs 88 and mounted beneath such lugs, slightly out of their normal paths or orbits, are the trigger members 90 similar to those previously described and similarly mounted in blocks 92. In lieu of air control as in the previously described applications of my invention, I have illustrated electrical control for an emergency power shut-off comprising a switch, generally illustrated by numeral 95, including a spring blade 95a provided with an upwardly projecting pin 95b. This pin is normally depressed by the spring urged ball 90a of the trigger member 90 to maintain the switch 95 closed, but in the event of bearing failure, one or both of the lugs 88 will depart from their normal orbit sufficiently to actuate or trip a trigger member 90 permitting the spring switch blade to move out of circuit closing position. Opening of either of the switches illustrated will result in shutting off the current supply to the motor as the switches are in series therewith. It will be obvious that some modification of the illustrated arrangement may be necessary in applying my invention to different types of motors.

While I have shown arrangements for illustrative purposes wherein a displaceable member controls directly a fluid pressure circuit, as in Figs. 2 and 8, and an electrical circuit in Fig. 11, and indirectly an electrical circuit in Fig. 2 also, it should be appreciated that departures may be made from the specific forms and applications of my invention as illustrated in the drawings and described hereinabove, and I do not wish to be restricted to such specific forms except as limited by the claims, properly construed with respect to the pertinent prior art.

I claim:

1. In combination with an engine having a reciprocating piston, a piston rod therefor, a rotating crank shaft, and means connecting one end of said piston rod to said crank shaft including a bearing member retaining the connected end of said piston rod in a normal orbit during rotation, a displaceable trigger member mounted adjacent said normal orbit of the attached end of said piston rod, a normally open power shut-off means, means for operating said power shut-off means to closed position, and means for effecting actuation of said last named means upon displacement of said trigger member, said trigger member being actuatable by said attached end of said piston rod upon departure thereof from its normal orbit upon failure of said bearing member to retain the connected end of the piston rod in said orbit to effect actuation of said power shut-off means to terminate operation of said engine.

2. In combination with an engine having a reciprocating piston, a piston rod therefor, a rotating crank shaft, and means connecting one end of said piston rod to said crank shaft including a bearing member retaining the connected end of said piston rod in a normal orbit during rotation, a trigger member mounted adjacent said normal orbit of the attached end of said piston rod, a pressure airline, said trigger member being provided with valve means normally closing said airline and arranged to open the latter upon actuation of the trigger member by operation thereof by said attached end of said piston rod upon departure thereof from its normal orbit upon failure of said bearing member to retain the connected end of the piston rod in said orbit, a power shut-off means, and means actuatable by the opening of said airline by said valve means to actuate said power shut-off to terminate operation of said engine.

3. The combination with an engine comprising a rotatable crank shaft, a piston rod, and means connecting one end of said piston rod to said crank shaft including a bearing member retaining the connected end of said piston rod in a normal orbit during rotation, of a displaceable member positioned adjacent the normal orbit of the connected end of said rod for displacement by the latter from said position upon movement of said portion from said orbit upon failure of said bearing member to retain the connected end of the piston rod in said orbit, a fuel supply line for the engine, a normally open valve in said line, and means controlled by said trigger for effecting closure of said valve upon said displacement of said trigger.

4. The combination with a rotary member provided with a bearing for retaining said member in a normal orbit during rotation, of a displaceable trigger member positioned adjacent the normal orbit of movement of the rotary member, means on said rotary member for displacing said trigger from said position upon movement of the rotary member from said normal orbit, upon failure of said bearing to retain said member in said orbit, means for interrupting the rotation of said rotary member, control means for said interrupting means, and means operable by said trigger member upon said displacement thereof for effecting actuation of said control means to effect the interruption of rotation of the rotary member.

LEWIS W. DOWNEY.

REFERENCES CITED

The following references are of record in the file of this patent:

UNITED STATES PATENTS

| Number | Name | Date |
| --- | --- | --- |
| 1,042,151 | Schnicke | Oct. 22, 1912 |
| 1,361,000 | Blain | Dec. 7, 1920 |
| 1,433,217 | Miller | Oct. 24, 1922 |
| 1,624,093 | Davis | Apr. 12, 1927 |
| 1,675,780 | Alric | July 3, 1928 |
| 1,743,758 | Cobb | Jan. 14, 1930 |
| 1,788,941 | Bradley | Jan. 13, 1931 |
| 2,010,960 | Pogue | Aug. 13, 1935 |
| 2,208,299 | Marcus | July 16, 1940 |
| 2,247,357 | Brus | July 1, 1941 |

FOREIGN PATENTS

| Number | Country | Date |
| --- | --- | --- |
| 576,459 | France | 1924 |
| 42,359 | Norway | 1926 |
| 301,037 | Great Britain | Feb. 24, 1930 |